(12) United States Patent
Niederberger (10) Patent No.: US 10,118,690 B2
(45) Date of Patent: Nov. 6, 2018

(54) AUTOMATED AND VERSATILE AUTONOMOUSLY CLIMBING UNDERCARRIAGE WITH FLIGHT CAPABILITY

(71) Applicant: Niederberger-Engineering AG, Oberdorf, NW (CH)

(72) Inventor: Anton Niederberger, Oberdorf (CH)

(73) Assignee: Niederberger-Engineering AG, Oberdorf, NW (CH)

( * ) Notice: Subject to any disclaimer, the term of this patent is extended or adjusted under 35 U.S.C. 154(b) by 36 days.

(21) Appl. No.: 14/787,273

(22) PCT Filed: Apr. 30, 2014

(86) PCT No.: PCT/EP2014/058929
§ 371 (c)(1),
(2) Date: Oct. 27, 2015

(87) PCT Pub. No.: WO2014/177661
PCT Pub. Date: Nov. 6, 2014

(65) Prior Publication Data
US 2016/0068261 A1 Mar. 10, 2016

(30) Foreign Application Priority Data
Apr. 30, 2013 (DE) .......... 10 2013 104 447

(51) Int. Cl.
*B64C 39/02* (2006.01)
*B64C 25/16* (2006.01)
(Continued)

(52) U.S. Cl.
CPC ........... *B64C 25/16* (2013.01); *A47L 1/02* (2013.01); *A63H 27/12* (2013.01); *B64C 27/08* (2013.01);
(Continued)

(58) Field of Classification Search
CPC ........... B64C 39/024; B64C 2201/00; B64C 2201/024; B64C 2201/12;
(Continued)

(56) References Cited

U.S. PATENT DOCUMENTS 6,419,190 B1 * 7/2002 Nguegang ............. B05C 1/08
118/256
2002/0119726 A1 8/2002 Wilk
(Continued)

FOREIGN PATENT DOCUMENTS

CN 101382426 A 3/2009
CN 101491898 A 7/2009
(Continued)

*Primary Examiner* — Tien Q Dinh
*Assistant Examiner* — Michael A. Fabula
(74) *Attorney, Agent, or Firm* — Michael Soderman (57) ABSTRACT

An automated and versatile autonomously climbing undercarriage with flight capability that automatically reaches a suitable area for cleaning purposes, repair purposes, and monitoring purposes without being constantly connected to a supply station or base station in the process, and that independently goes to the surface of the facade and independently moves along the surface and away from the surface. The automated and versatile autonomously climbing undercarriage with vacuum suction units as per the invention involves a multicopter with two, three or more rotors or propellers attached to the autonomously climbing undercarriage.

8 Claims, 8 Drawing Sheets

(51) Int. Cl.
*A63H 27/00* (2006.01)
*A47L 1/02* (2006.01)
*B64C 27/08* (2006.01)
*E04G 23/00* (2006.01)

(52) U.S. Cl.
CPC ...... *B64C 39/024* (2013.01); *B64C 2201/027* (2013.01); *B64C 2201/12* (2013.01); *E04G 23/002* (2013.01)

(58) Field of Classification Search
CPC . B64C 2201/108; B64C 25/001; A63H 27/14; A47L 1/02; A47L 11/38
See application file for complete search history.

(56) References Cited

U.S. PATENT DOCUMENTS

| | | | |
|---|---|---|---|
| 2003/0048081 A1 | 3/2003 | Seemann | |
| 2009/0166102 A1* | 7/2009 | Waibel | B08B 1/008 180/7.1 |
| 2012/0181096 A1* | 7/2012 | Niederberger | B62D 55/265 180/9.42 |
| 2012/0187752 A1* | 7/2012 | Niederberger | B62D 57/024 305/165 |
| 2012/0226394 A1 | 9/2012 | Marcus | |
| 2013/0007971 A1* | 1/2013 | Juergens | A47L 1/02 15/98 |
| 2013/0193293 A1* | 8/2013 | Jones | A62B 35/0068 248/362 |
| 2015/0026909 A1* | 1/2015 | Baek | A47L 1/03 15/250.11 |
| 2015/0027493 A1* | 1/2015 | Baek | A47L 1/12 134/6 |
| 2015/0027494 A1* | 1/2015 | Ryu | A47L 1/03 134/6 |
| 2016/0081520 A1* | 3/2016 | Ryu | A47L 1/03 134/18 |

FOREIGN PATENT DOCUMENTS

| | | |
|---|---|---|
| CN | 101537777 A | 9/2009 |
| CN | 102390528 A | 3/2012 |
| DE | 102005020593 A1 | 11/2006 |
| DE | 102007003458 A1 | 7/2008 |
| DE | 102009047991 B3 | 3/2011 |
| DE | 202012100128 U1 | 2/2012 |
| EP | 0401120 A1 | 12/1990 |
| EP | 2003057 A2 | 12/2008 |

* cited by examiner

AUTOMATED AND VERSATILE AUTONOMOUSLY CLIMBING UNDERCARRIAGE WITH FLIGHT CAPABILITY

CROSS REFERENCE TO RELATED APPLICATIONS

This application is the U.S. national stage of International Application No. PCT/EP2014/058929, filed on Apr. 30, 2014, and claims the benefit thereof. The international application claims the benefits of German Application No. DE 102013104447.6 filed on Apr. 30, 2013; all applications are incorporated by reference herein in their entirety.

BACKGROUND

The invention relates to an automated and versatile autonomously climbing undercarriage coupled with a multicopter that is in a position to independently reach an area that is to be cleaned or to be inspected from a starting point; to clean, inspect or maintain this area and to then once again return to a starting point.

WO 2010 083619 A1 is to be designated as the closest prior art, in which a facade-cleaning system coupled with an airship is described. A drawback is that this solution can only be used outside of buildings because of its size. Furthermore, operation can only be realized with difficulty. Moreover, this solution is particularly susceptible to wind because of the special design circumstances.

On top of that, facade elevator systems for universal use are known with cabins suspended from cranes located on the roof or under the ceiling of the respective building that are lowered or pulled up with them along the facade. They have the disadvantage that the components required to operate the facade elevator system are expensive to set up and maintain. Moreover, they can only be concealed with a great deal of effort, especially in the building. Furthermore, facade cleaning systems of this type can only be used on vertical facades. Areas that are difficult to access can only be reached with an extreme amount of work. Also, manual add-ons may be required. Above all tilted areas or areas with an overhang cannot be reached with facade elevator systems.

Systems that are arranged on long extension arms and that can be used on facades inside and outside of buildings also have the drawback that they can only be implemented in an expensive way and only have a limited working radius.

SUMMARY

The object of the invention is to therefore create an automated and versatile autonomously climbing undercarriage with flight capability that automatically reaches a suitable area for cleaning purposes, repair purposes, and monitoring purposes without being constantly connected to a supply station or base station in the process, and that independently goes to the surface of the facade and independently moves along the surface and away from the surface.

The automated and versatile autonomously climbing undercarriage (1) with vacuum suction units (2) as per the invention involves a multicopter (3) with two, three or more rotors (11) or propellers (11) attached to the autonomously climbing undercarriage (1).

DETAILED DESCRIPTION

The object of the invention is to therefore create an automated and versatile autonomously climbing undercarriage with flight capability that automatically reaches a suitable area for cleaning purposes, repair purposes, coating processes, pressure processes and monitoring purposes without being constantly connected to a supply station or base station in the process, and that independently goes to the surface of the facade and independently moves along the surface and away from the surface.

An automated and versatile autonomously climbing undercarriage is created with the invention in the applications that have been stated; the autonomously climbing undercarriage is attached to a multicopter and consequently reaches nearly every point of any area with the aid of the multicopter. Areas that are difficult to access, which were previously inaccessible or only accessible with a substantial amount of work, can be reached in this way both inside and outside of the building. Diverse applications and activities can be realized with the aid of this assembly. Moreover, multicopters with two, three or more rotors or propellers have good flight characteristics that ensure a simple and reliable flight of the autonomously climbing undercarriage. Furthermore, a safe landing and placement of the autonomously climbing undercarriage at or on the respective surface is reliably possible. On top of that, multicopters have a low unladen weight. They are in a position, via suitable control, to have a stabilizing effect on the autonomously climbing undercarriage if external conditions require it.

Advantageous embodiments of the autonomously climbing undercarriage are shown in subordinate claims.

It is especially advantageous when, according to one embodiment, the autonomously climbing undercarriage and the multicopter can be moved relatively to one another. An adjustment of the position vis-a-vis one another is possible because of this. This position adjustment permits the assembly to be adapted to the respective circumstances and locations, for instance during use or in an on-call state, in order to avoid unfavorable circumstances because of levering effects or wind susceptibilities and to achieve design simplification. Moreover, the assembly can be used or preserved in a space-saving way without disassembling them.

The autonomously climbing undercarriage is attached to the multicopter via a support arm, according to another embodiment, to increase the flexibility of movement and to provide movement freedom. Special positions of the autonomously climbing undercarriage with regard to a surface and with regard to the multicopter can consequently be achieved; mutually unfavorable influences on the autonomously climbing undercarriage and the multicopter are avoided.

Various tasks can be carried out without a time-consuming reconstruction being required because, according to a further design variant, a cleaning unit, a tool holder, an assembly unit, pressure devices, coating devices and means for visual monitoring are available or mounted on the autonomously climbing undercarriage. All of the above-mentioned resources can be combined with the autonomously climbing undercarriage without any problems. The application range of the assembly is substantially expanded because of that.

Storage tanks are advantageously provided on the multicopter and the autonomously climbing undercarriage, according to another embodiment, that make it possible to take along the operating supplies required for the respective application, such as water, cleaning agents and compressed air. It is also possible for several storage tanks to be combined in a suitable way or used separately, in order to be able to carry along the required amounts of the respective operating supplies if necessary.

Since, in a further design form, at least one locally flexible energy supply unit and one locally fixed energy supply unit are provided on the multicopter and on the autonomously climbing undercarriage, only a short stay at the docking station is required, because only an exchange of storage cells or batteries takes place, and a longer charging process is avoided. The multicopter with the autonomously climbing undercarriage is consequently very quickly ready to operate again. The work is only interrupted for a very short period of time in connection with this.

According to an additional embodiment, a docking station is available to ensure automatic and flexible use. Interfaces are in operation in this docking station, especially to supply energy to the storage cells of the multicopter and of the autonomously climbing undercarriage that are required for operation and to the respective add-ons that are being used. Furthermore, interfaces to supply the multicopter and the autonomously climbing undercarriage, depending on the application, with water, cleaning agents and compressed air are available to correspondingly fill up the storage tanks if needed.

Photovoltaic modules are provided in a further design variant to achieve a longer operating period and to provide for interim charging of the storage cells of the multicopter and of the autonomously climbing undercarriage. It is possible because of this to extend the operating period of the assembly between charging cycles; the assembly can remain in use for a longer period of time and consequently operations in a more efficient way. Moreover, bottlenecks in the energy supply can be balanced out, especially when recharging of the rechargeable batteries is delayed or prevented for reasons that were not foreseen or when recharging is not desired to achieve a certain objective.

Means for audiovisual monitoring are also provided on the multicopter in another embodiment for reliable operation and to expand the application area. They make monitoring of the environment possible during the flight and a targeted steering of the flight and a monitoring of the environment during use that is independent of audiovisual monitoring that may exist on the autonomously climbing undercarriage.

The multicopter or the autonomously climbing undercarriage advantageously has means for position determination in another design form. The respective whereabouts can consequently be determined in a reliable way, and the assembly can be tracked down. Further, it is possible because of the position determination for multicopters positioned close by to be given preference for a certain application for purposes of optimizing the path with the aid of the respective position. Also, the multicopters can be steered in a targeted way to a certain position. Movements that can be performed in a very precise way are possible depending on the type of position determination as an absolute or relative position determination system.

Targeted use that is in line with the requirements is possible because, according to a further embodiment, the multicopter and the autonomously climbing undercarriage can be remotely operated or controlled. Concrete coordinates can be flown to in an automated way in that fashion in connection with position data without continuous monitoring by operating personnel being required. Corrections of the automated process are possible, however.

The assembly as per the invention is to be shown in more detail with the aid of drawings and described in more detail in the following examples.

DETAILED DESCRIPTION OF THE PREFERRED EMBODIMENT

The automated and versatile autonomously climbing undercarriage 1 with vacuum suction units 2 is attached to a multicopter 3. This multicopter 3 is, as shown in FIGS. 1 to 3, 5 and 7, a quadrocopter due to the good flight characteristics. Different multicopters 3 with two, three or more rotors 11 or propellers 11, for instance bicopters, tricopters and sixcopters, octocopters or other multicopters with multiple rotors or propellers are also suitable, however. The respective multicopters 3 are to be selected in dependence upon the requirements and the loads to be carried. The multicopter 3 and the autonomously climbing undercarriage 1, as well as resources arranged on them, are supplied with energy via batteries or storage cells.

The autonomously climbing undercarriage 1 is attached to the multicopter 3 via two motor-driven swivel joints 9 that are independent of one another. The swivel joints 9 are arranged in such a way here that their rotational axes are at a right angle to one another. The assembly made up of the autonomously climbing undercarriage 1 and the multicopter 3 is consequently in a position to be put into nearly any arbitrary position or location relative to one another. Negative influences on the flight behavior, such as a levering effect because of the one-sided distributions of loads, can consequently be at least reduced. That also applies to the work on the respective surface 10. The multicopter 3 can be positioned in such a way here that the influence of the multicopter 3 on the autonomously climbing undercarriage 1 and of the holding effect of the vacuum suction units 2 on the surface 10 is reduced.

Figure 8:
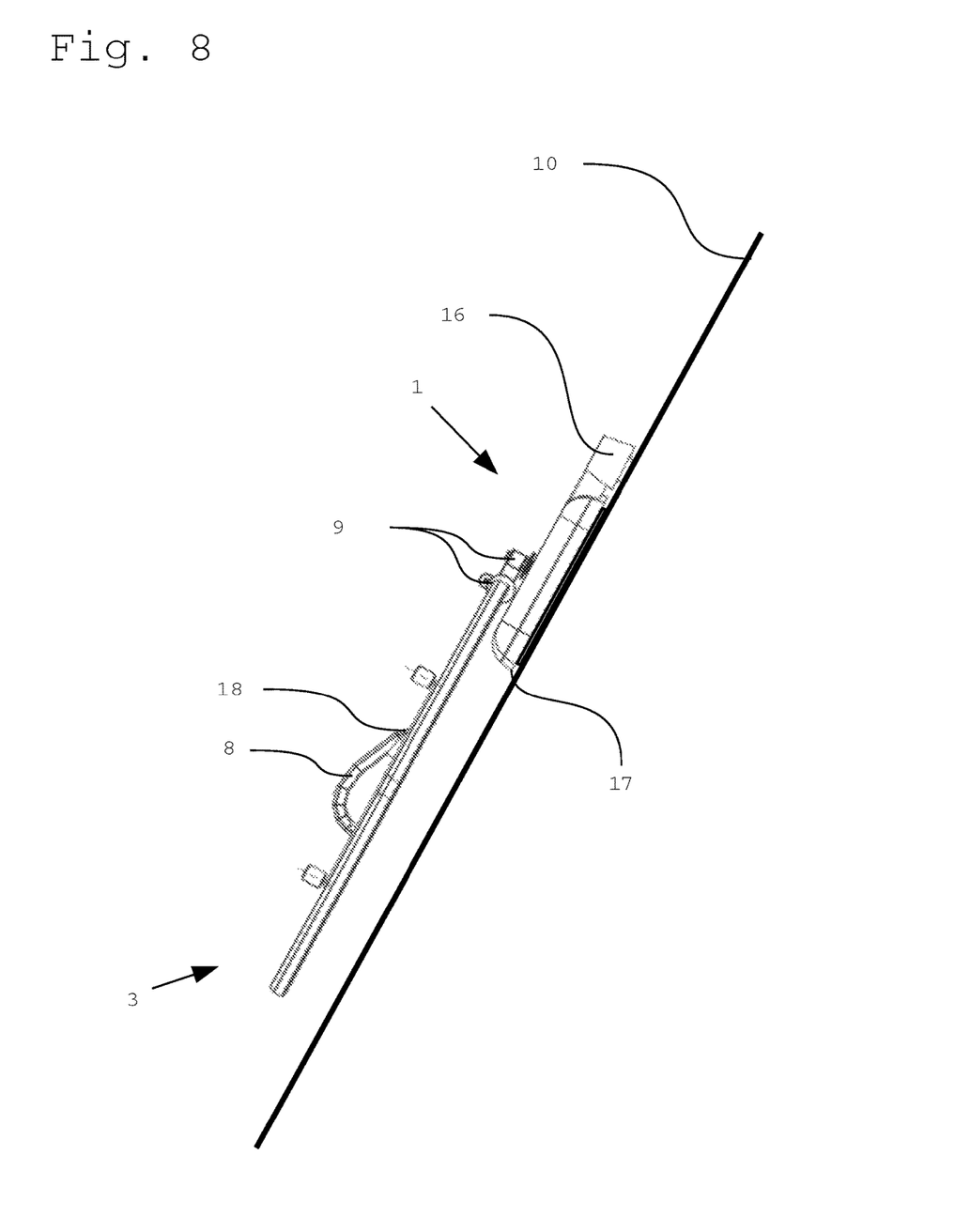
FIGS. 8 and 9 show a multicopter in the form of a quadrocopter with an autonomously climbing undercarriage attached to it and additionally arranged in a lengthwise fashion in a side view on a facade in the working position.

The autonomously climbing undercarriage 1 can be adapted to the position or tilt of the respective surface 10 or facade 10 via an adjustment of the positions between the multicopter 3 and the autonomously climbing undercarriage 1 in such a way that the vacuum suction units 2 of the autonomously climbing undercarriage 1 point in the direction of the surface 10 or facade 10 when the surface 10 or facade 10 is approached. The vacuum suction units 2 pull the autonomously climbing undercarriage 1 onto the surface 10 or facade 10 via suction upon the first contact and take over further movements. The surface 10 can have nearly any orientation here. Vertical or tilted facades 10 can be reached in the same way. A reliable handover is possible in each case. FIG. 8 shows the assembly made up of a multicopter 3 and an autonomously climbing undercarriage 1 on a tilted facade 10.

Since the autonomously climbing undercarriage 1 can be transported to nearly any areas of an arbitrary surface 10 via the multicopter 3, different types of work or activities can be carried out in these areas. The cleaning of a specified surface section or the performance of maintenance work, repair work or audiovisual inspection work on it is also envisaged here. The tools or resources required for the respective work and activities can be mounted without any problems on the autonomously climbing undercarriage 1. The storage tanks 6 that are provided for cleaning agents or water can also be converted, in line with the requirements for performing repair work, to hold material or to hold tools in the form of a tool holder 4 or an assembly unit 4. Moreover, compressed-air tanks are provided for cleaning purposes. It is, however, also possible to use excess compress-air reserves for venturi vacuum suction units 2 that may be used and to pass the reserves along to them.

Furthermore, the autonomously climbing undercarriage 1, which is expanded or supplemented with the multicopter 3, can be used to carry out targeted monitoring of buildings or other areas. To this end, it is envisaged that the autonomously climbing undercarriage 1 can have at least have a monitoring camera 5 and a microphone. If necessary, the multicopter 3 and the autonomously climbing undercarriage 1 can be remotely controlled via a wireless network connection 19 like a LAN or a cellular network 19 if necessary and the image data and sound data can be transmitted to the remote-control operators or a monitoring site. Moreover, resources for visual and acoustic recording are also provided in the multicopter 3. Manual and distant, remotely controlled navigation is enabled and at the very least simplified because of that. The navigation and position monitoring are, on top of that, simplified via the existing resources for determining the position. Automated, remote-control operation is possible because of this. Extremely precise location data and movement data can be recorded, depending on the positioning system that is used. Fully automated navigation is consequently possible when necessary. Monitoring with regard to the current location of the multicopter 3 with an autonomously climbing undercarriage 1 is especially possible in the case of very confusing local circumstances via the positioning data.

Figure 1:
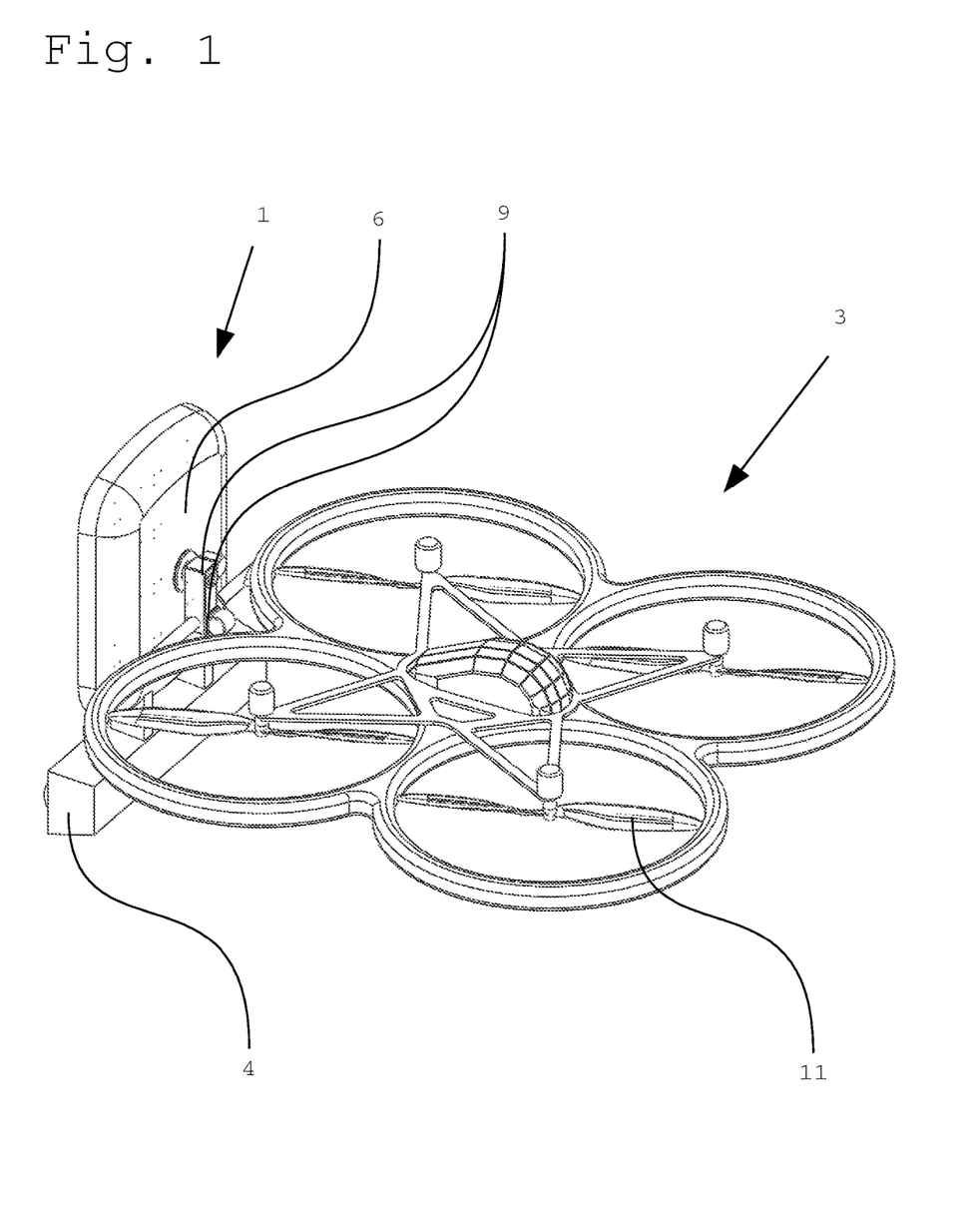
FIGS. 1 and 2 show an autonomously climbing undercarriage in an upright position that is attached to a multicopter in the form of a quadrocopter in a spatial depiction from above.
Figure 2:
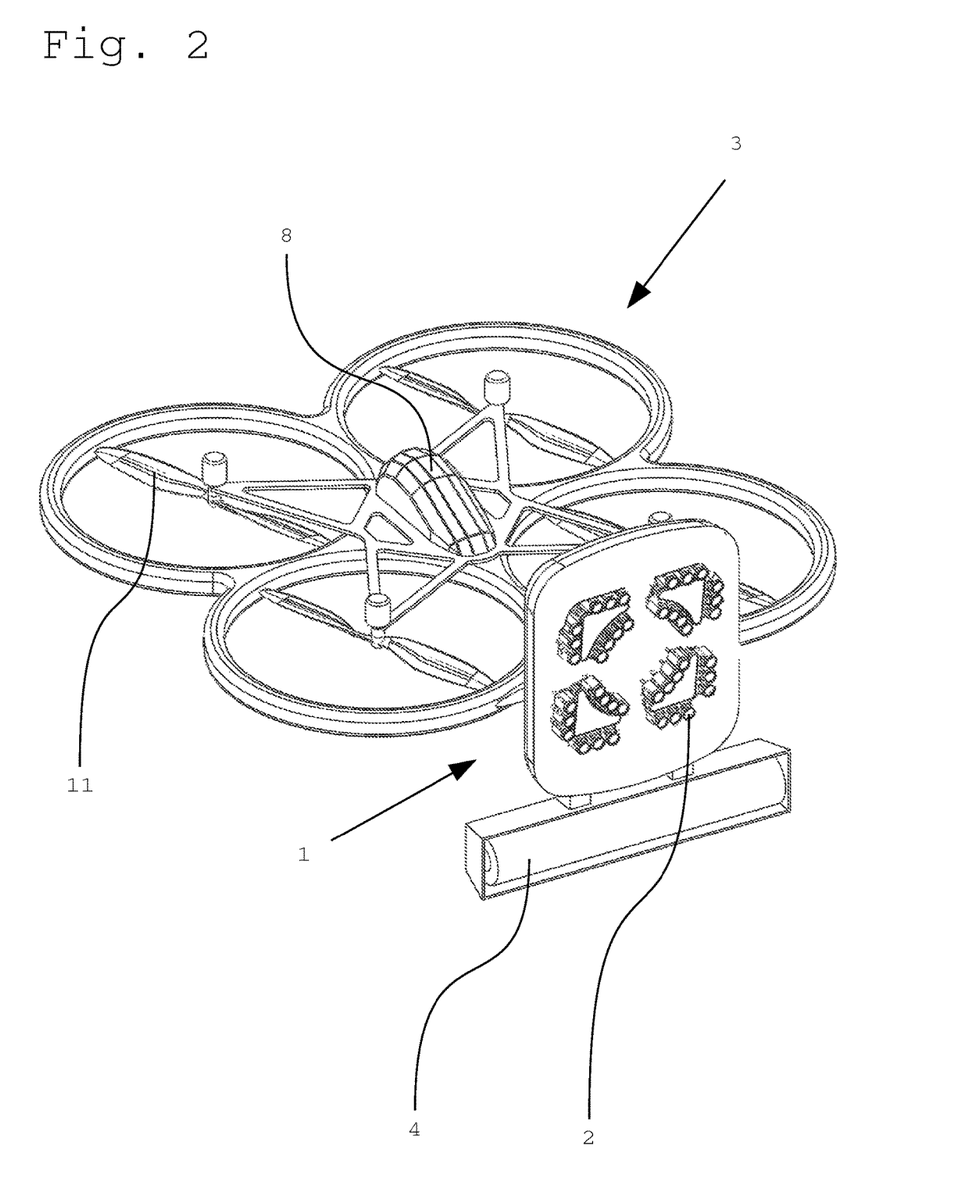
Figure 3:
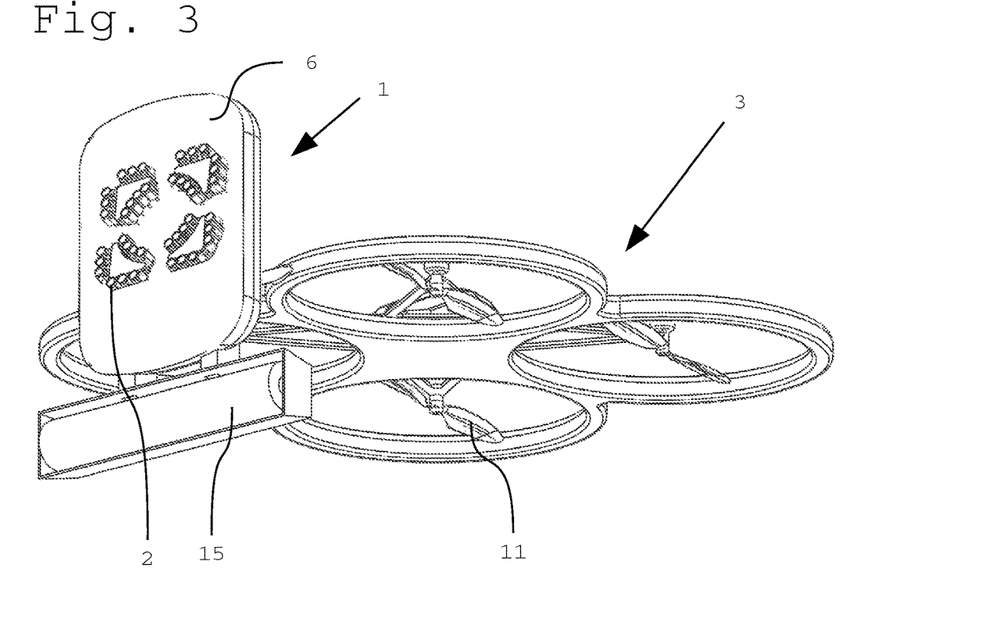
FIG. 3 shows an autonomously climbing undercarriage in an upright position that is attached to a multicopter in the form of a quadrocopter in a spatial depiction from below.
Figure 4:
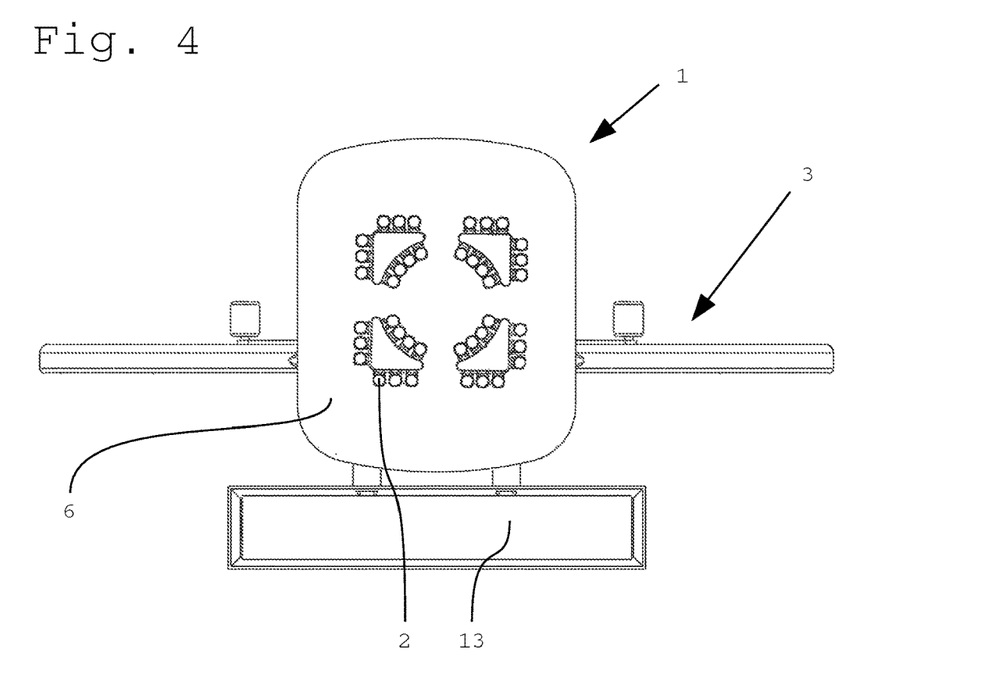
FIG. 4 shows an autonomously climbing undercarriage in an upright position that is attached to a multicopter in the form of a quadrocopter in side view.
Figure 5:
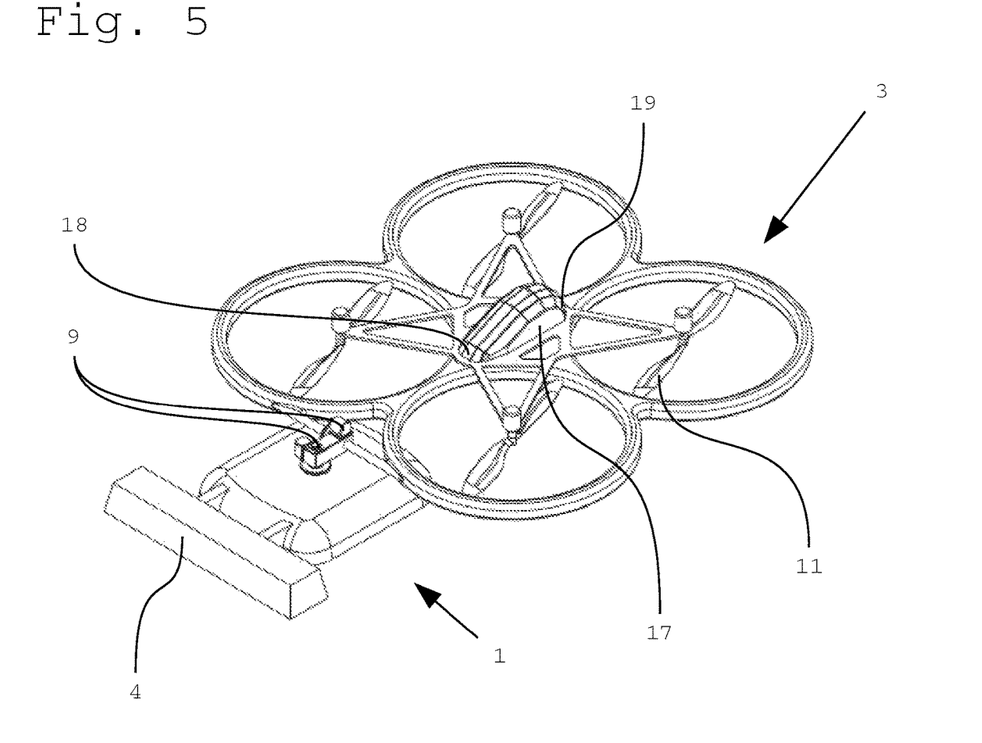
FIG. 5 shows a multicopter in the form of a quadrocopter with an autonomously climbing undercarriage attached to it and additionally arranged in a lengthwise fashion in a spatial depiction from above.
Figure 6:
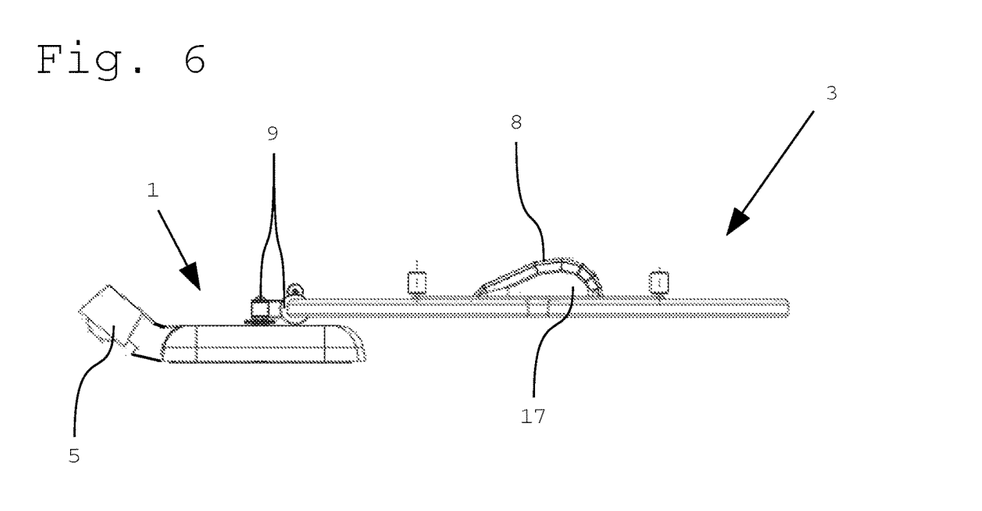
FIG. 6 shows a multicopter in the form of a quadrocopter with an autonomously climbing undercarriage attached to it and additionally arranged in a lengthwise fashion in a side view.
Figure 7:
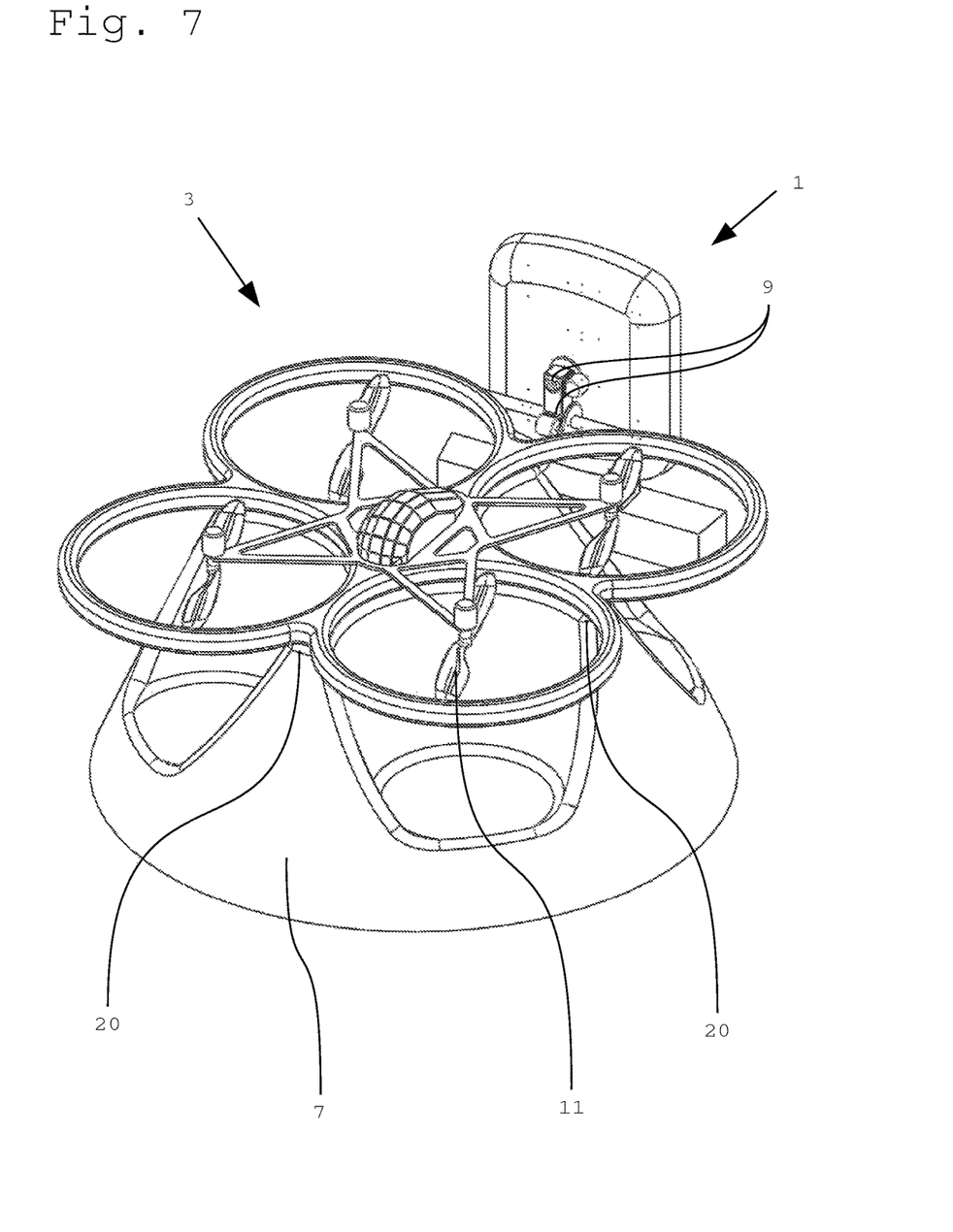
FIG. 7 shows a docking station with a multicopter in the form of a quadrocopter and an autonomously climbing undercarriage attached to the quadrocopter and in an upright position with regard to it.

A docking station 7 is available to charge the batteries or storage cells and to refill the storage tank 6 or to provide tools or material. As soon as the charging state of the batteries or storage cells reach a critical value or have already exceeded a critical value, the multicopter 3 immediately flies to the docking station 7 with the aid of the energy reserves. The same applies when the storage tank 6 or the batteries or storage cells of the autonomously climbing undercarriage 1 are empty or at least mostly empty or discharged. The multicopter 3 and the autonomously climbing undercarriage 1 are prepared for operation once again at the docking station 7.

The permanently installed, locally fixed batteries or storage cells can be automatically charged at the docking station 7. The batteries or storage cells are the energy supply for the assembly made up of the multicopter 3 and the autonomously climbing undercarriage 1. A joint energy supply unit for this assembly and separate energy supply units in each case for the multicopter 3 and the autonomously climbing undercarriage 1 are provided in connection with this. Alternatively, an automated replacement of the locally flexible batteries or storage cells with a charged battery or charged storage cells is provided for an especially short interruption. The interruption times in the work process can be reduced in that way. The respective locally flexible energy supply units can be disengaged from the multicopter 3 and the autonomously climbing undercarriage 1 via the docking station 7 and replaced for charged-up energy supply units.

Photovoltaic modules 8 are provided to balance out energy bottlenecks and, depending on the place of use, to avoid interruptions for the exchange or charging of the energy supply unit at the docking station. They can be arranged on both the multicopter 3 and the autonomously climbing undercarriage 1.

Figure 9:
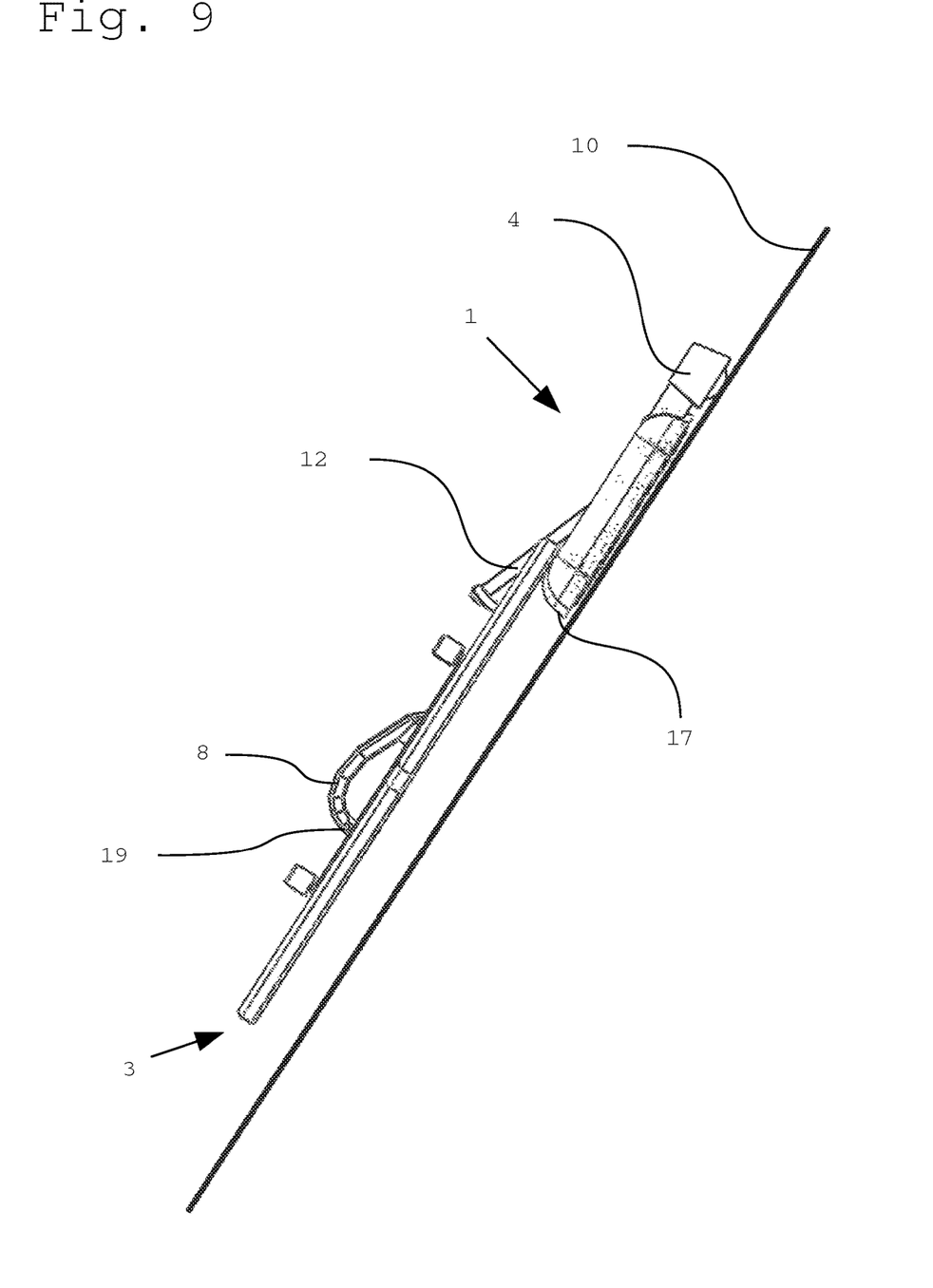
Figure 10:
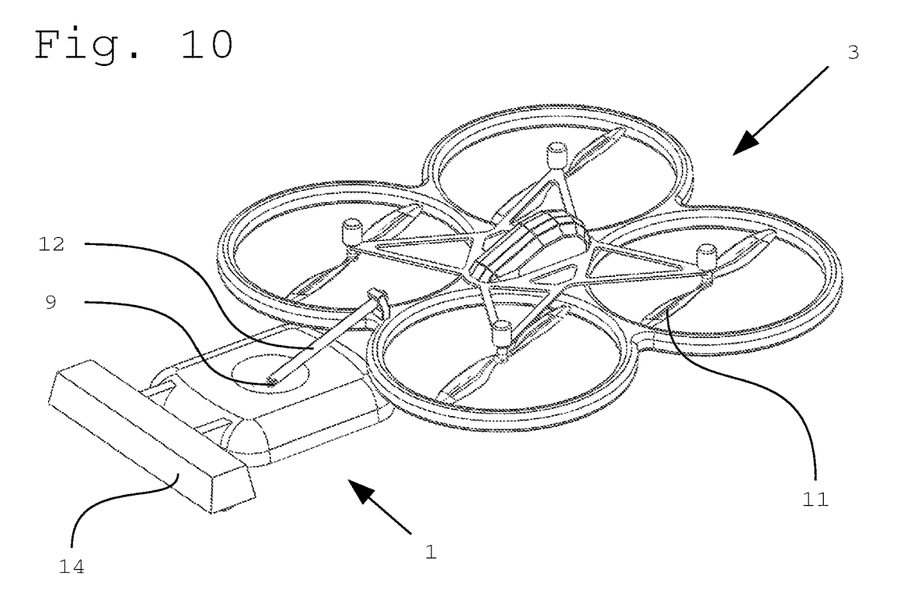
FIG. 10 shows a multicopter in the form of a quadrocopter with an autonomously climbing undercarriage attached to a support arm and arranged in a lengthwise fashion in a spatial depiction from above.
Figure 11:
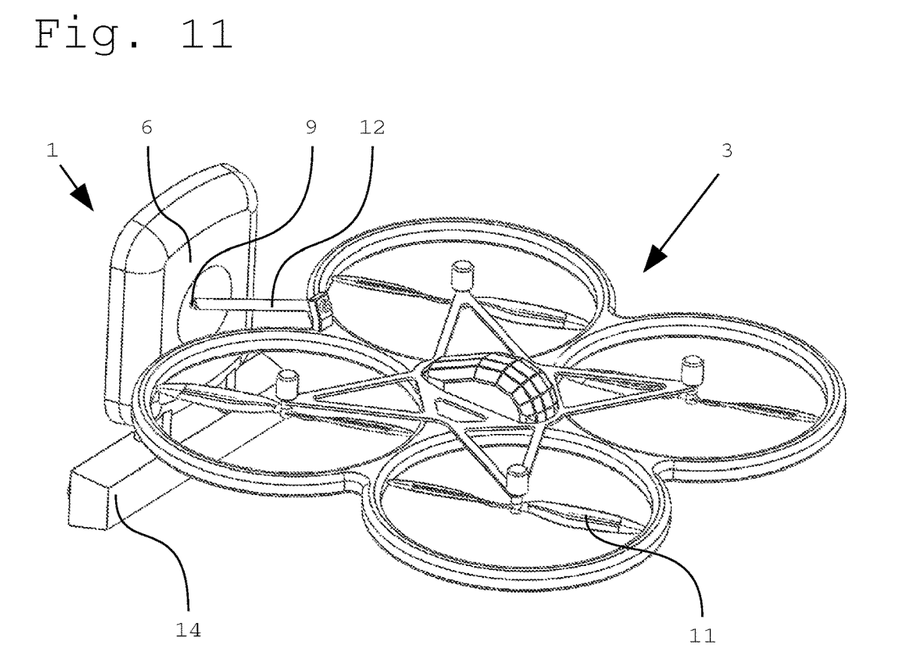
FIG. 11 shows an upright autonomously climbing undercarriage attached to a support arm on a multicopter in the form of a quadrocopter in a spatial depiction from above.

FIGS. 9 to 11 show an autonomously climbing undercarriage 1 that is attached via a support arm 12 to a multicopter 3 in the form of a quadrocopter. The support arm 12 is attached here via a ball joint 9, which can be adjusted with an electric motor, on the autonomously climbing undercarriage 1. The autonomously climbing undercarriage 1 can consequently be individually swiveled and rotated into the required position with regard to the surface 10 to be processed. Movements of the autonomously climbing undercarriage 1 are therefore possible on the surface 10 without the position of the multicopter 3 changing relative to the surface. Levering effects are consequently reduced to a minimum. The support arm 12 is rigidly attached to the multicopter 3 in this concrete example. A design is also envisaged here with a swivel joint 9 on the multicopter 3 to adjust the position of the autonomously climbing undercarriage 1 with respect to the multicopter 3 in an even more individualized way. So the ball joint 9 on the autonomously climbing undercarriage 1 can also be designed in the form of a swivel joint 9. Overhead applications can also be realized via the assembly of the autonomously climbing undercarriage 1 and the multicopter 3 through the support arm 12. The autonomously climbing undercarriage 1 is swiveled over the multicopter for that.

LIST OF REFERENCE NUMERALS

1—Autonomously climbing undercarriage
2—Vacuum suction unit
3—Multicopter
4—Cleaning equipment
5—Visual monitoring, acoustic monitoring
6—Storage tank, can also be compressed-air tank
7—Docking station
8—Photovoltaic module
9—Joint, ball joint, swivel joint
10—Facade, surface
11—Rotor, propeller
12—Support arm
13—Tool holder
14—Assembly unit
15—Pressure devices 16—Coating devices
17—Energy supply unit
18—Resources for determining the position
19—Wireless network connection, cellular network
20—Interface

The invention claimed is:

1. An automated autonomously climbing undercarriage (1) with venturi vacuum suction units (2) powered by excess compressed-air reserves (6), comprising
    a multicopter (3)
        with two, three or more rotors (11) or propellers (11) attached to the autonomously climbing undercarriage (1),
    wherein said multicopter (3) executes flight to a surface (10) and said autonomously climbing undercarriage (1) then executes movement along the surface (10), and
    wherein the autonomously climbing undercarriage (1) and the multicopter (3) can be moved relative to one another via at least one ball joint (9).

2. The autonomously climbing undercarriage according to claim 1, characterized in that
    the autonomously climbing undercarriage (1) is attached to the multicopter (3) via at least one support arm (12) extending from the multicopter and the ball joint (9) on the autonomously climbing undercarriage.

3. The autonomously climbing undercarriage according to claim 1, characterized in that
    a cleaning unit, a tool holder, and/or resources for acoustic and/or visual monitoring (5) exist on the autonomously climbing undercarriage (1).

4. The autonomously climbing undercarriage according to claim 1, characterized in that
    at least one storage tank (6) for water, cleaning agents and/or compressed air is arranged on the multicopter (3) and/or the autonomously climbing undercarriage (1).

5. The autonomously climbing undercarriage according to claim 1, characterized in that the multicopter (3) and/or the autonomously climbing undercarriage (1) have at least one integral and/or one removable energy supply unit.

6. The autonomously climbing undercarriage according to claim 1 in combination with at least one docking station, characterized in that
    interfaces (20) to charge up the energy supply unit, to exchange the energy supply unit, to provide compressed air, to provide water, to provide cleaning agents and/or to effect a tool change are available at the docking station (7).

7. The autonomously climbing undercarriage according to claim 1, characterized in that
    the multicopter (3) and/or the autonomously climbing undercarriage (1) have photovoltaic modules (8).

8. The autonomously climbing undercarriage according to claim 1, characterized in that
    the multicopter (3) has resources for acoustic and/or visual monitoring.

* * * * *